United States Patent [19]

Rawcliffe

[11] 4,260,923
[45] Apr. 7, 1981

[54] POLE-AMPLITUDE MODULATION POLE-CHANGING ELECTRIC MOTORS AND GENERATORS

[75] Inventor: Gordon H. Rawcliffe, Clifton, England

[73] Assignee: National Research Development Corporation, Clifton, England

[21] Appl. No.: 21,771

[22] Filed: Mar. 19, 1979

[30] Foreign Application Priority Data

May 25, 1978 [GB] United Kingdom ............... 22541/78

[51] Int. Cl.³ .............................................. H02K 3/00
[52] U.S. Cl. .................................. 310/184; 310/198; 318/773
[58] Field of Search ........ 310/179, 180, 184, 198–208; 318/773–777

[56] References Cited

U.S. PATENT DOCUMENTS

| | | | |
|---|---|---|---|
| 3,175,142 | 3/1965 | Rawcliffe | 318/773 |
| 3,949,253 | 4/1976 | Broadway | 310/203 |
| 4,013,909 | 3/1977 | Broadway | 310/202 |
| 4,127,787 | 11/1978 | Auinger | 310/184 |
| 4,144,470 | 3/1979 | Auinger | 310/198 |
| 4,158,788 | 6/1979 | Godwin | 318/773 |

*Primary Examiner*—R. Skudy
*Attorney, Agent, or Firm*—Larson, Taylor and Hinds

[57] ABSTRACT

The invention provides improved stator windings for pole-amplitude modulation (P.A.M.) pole-changing electric motors and generators. In large machine of high pole-numbers, the effect of adjacent harmonics of m.m.f. waveform becomes evident in the form of low-frequency vibration of the frame. In small machines the effect, although present, is less important. The invention provides stator windings, particularly for large machines, wherein the phase-winding coil grouping, selected primarily for sinusoidal modulation, is selected secondarily to include a third-harmonic content, whereby the adjacent harmonic m.m.f. content may be reduced for both alternative pole-numbers.

8 Claims, 14 Drawing Figures

(a) 6-12-6-0 } 'Sinusoidal'
(b) 7-10-7-0 }
(c) 9-7-8-0 } With third harmonic added
(d) 9-6-9-0 }

Coil-pitch 10 slots (1—11 etc)

8–poles ⅄⅄  Supply $A_1, B_1, C_1$;  Join $A_2, B_2, C_2$.

10 poles △  Supply $A_2, B_2, C_2$;  Isolate $A_1, B_1, C_1$.

Opposite directions of rotation for same supply sequence

A=5
B=0
C=1

(1)

A=4
B=0
C=2

(2)

A=4
B=1
C=1

(3)

10-pole sequence
A B C
Slot angle 150°

12-pole sequence
A C B
Slot angle 180°

10-pole sequence
A B C
Slot angle 150°

12-pole sequence
A C B
Slot angle 180°

| Slot Nos. | 1 | 2 | 3 | 4 | 5 | 6 | 7 | 8 | 9 | 10 | 11 | 12 | | |
|---|---|---|---|---|---|---|---|---|---|---|---|---|---|---|
| (1) 10 pole | A | -A | A | -A | C | A | -A | A | -A | A | -C | -A | A=5, C=1, B=0 | |
| 12 pole | A | -A | A | -A | -C | -A | A | -A | A | -A | -C | -A | | |
| (2) 10 pole | A | -A | A | -C | C | A | -A | A | -A | C | -C | -A | A=4, C=2, B=0 | |
| 12 pole | A | -A | A | C | -C | -A | A | -A | A | C | -C | -A | | |
| (3) 10 pole | A | -A | A | B | C | A | -A | A | -A | -B | -C | -A | A=4, C=1, B=1 | |
| 12 pole | A | -A | A | B | -C | -A | A | -A | A | B | -C | -A | | |
| (4) 10 pole | A | -A | A | -C | C | -C | -A | A | -A | C | -C | C | A=3, C=3, B=0 | |
| 12 pole | A | -A | A | C | -C | C | A | -A | A | C | -C | C | | |
| (5) 10 pole | A | -A | A | B | C | -C | -A | A | -A | -B | -C | C | A=3, C=2, B=1 | |
| 12 pole | A | -A | A | B | -C | C | A | -A | A | B | -C | C | | |
| (6) 10 pole | A | -A | -B | B | C | -C | -A | A | B | -B | -C | C | A=2, C=2, B=2 | |
| 12 pole | A | -A | -B | B | -C | C | A | -A | -B | B | -C | C | | |

FIG.6.

Coil-pitch 8 slots (1-9 etc.).

10 poles, parallel-star: Supply $A_1, B_1, C_1$; Join $A_2, B_2, C_2$ 12 poles, series-delta Supply $A_2, B_2, C_2$; Isolate $A_1, B_1, C_1$.

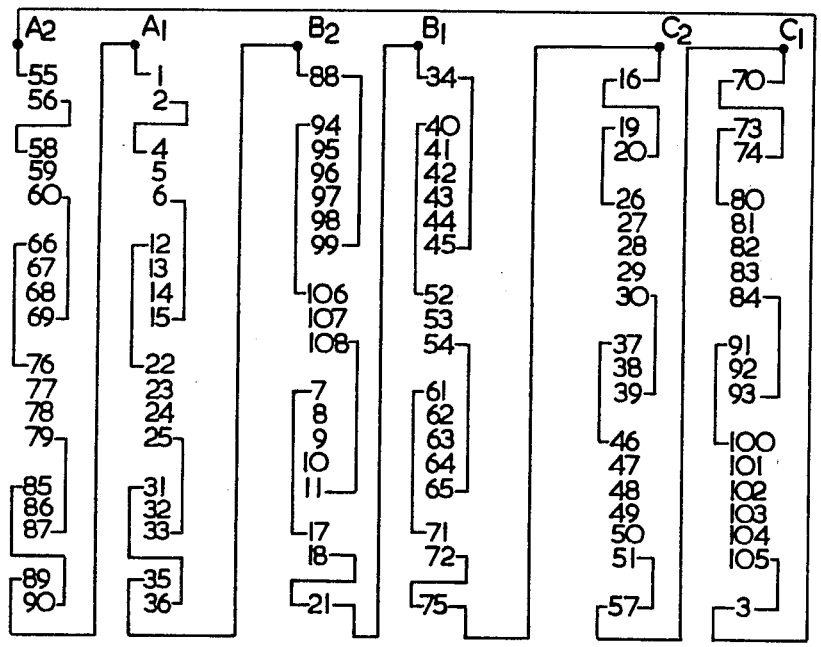
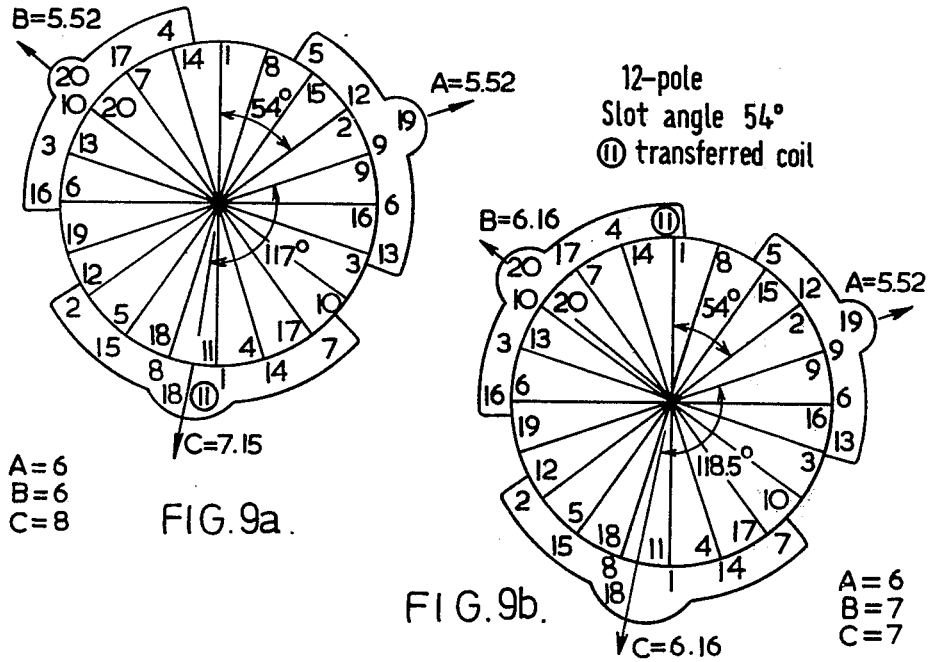
FIG. 8.
FIG. 9a.
FIG. 9b.

Coil-pitch 13 slots (1–14 etc.)

10 pole (  )  Supply $A_1, B_1, C_1$.  Join $A_2, B_2, C_2$.
12 pole ( △ )  Supply $A_2, B_2, C_2$.  Isolate $A_1, B_1, C_1$.

6 pairs of interspersed coil-groups 6-pole modulation

Coil-grouping shown is for 14/8 poles in 108 slots
2-3-3-3-3-3-1 per modulating pole
six modulating poles, interspersed.

Coil pitch 11 slots (1–12 etc.)

8 poles ⋏⋏  Supply $A_1$, $B_1$, $C_1$; Join $A_2$, $B_2$, $C_2$.

14 poles ⋏  Supply $A_2$, $B_2$, $C_2$; Isolate $A_1$, $B_1$, $C_1$.

| Slot-number coil-pitch, and coil-grouping of one half-phase (x-y-z-o) | Adjacent Harmonics | | R $=\left[\dfrac{x+z}{2y}\right]$ | $w_8$ | $w_{10}$ | $\dfrac{B_8}{B_{10}}$ |
|---|---|---|---|---|---|---|
| | For 8 poles | For 10 poles | | | | |
| (b) 144 slots (original) 12 (7-10-7-0) slots | 37.4 | 22.0 | 0.70 | 0.748 | 0.825 | 1.02 |
| (d) 144 slots (revised) 12 (9-6-9-0) slots | 19.6 | 4.0 | 1.50 | 0.773 | 0.776 | 0.93 |
| 120 slots (original) 10 (6-8-6-0) slots | 35.3 | 20.7 | 0.75 | 0.753 | 0.826 | 1.01 |
| * 120 slots (revised) 10 (7-5-8-0) slots | 20.3 | 4.7 | 1.50 | 0.772 | 0.776 | 0.93 |
| 108 slots (original) 10 (5-8-5-0) slots | 42.4 | 21.7 | 0.62 | 0.784 | 0.845 | 0.99 |
| 108 slots (revised) (7-4-7-0) 10 or slots (7-5-6-0) | 17.8 23.8 | 0.1 7.5 | 1.75 1.30 | 0.819 0.818 | 0.780 0.815 | 0.88 0.92 |
| 72 slots (original) 7 (4-5-3-0) slots | 40.4 | 19.4 | 0.70 | 0.811 | 0.854 | 0.97 |
| 72 slots (revised) 7 (5-3-4-0) slots | 22.6 | 5.0 | 1.50 | 0.838 | 0.804 | 0.88 |

TABLE 1   8/10-POLE P.A.M. WINDINGS WITH THIRD-HARMONIC MODULATION.

| 10 Slots (180) | | | 9 Slots (162) | | | 8 Slots (144) | | | 7 Slots (126) | | | 6 Slots (108) | | | 5 Slots (90) | | |
|---|---|---|---|---|---|---|---|---|---|---|---|---|---|---|---|---|---|
| A | B | C | A | B | C | A | B | C | A | B | C | A | B | C | A | B | C |
| 9 | 1 | 0 | 8 | 1 | 0 | 7 | 1 | 0 | 6 | 1 | 0 | 5 | 1 | 0 | 4 | 1 | 0 |
| 8 | 2 | 0 | 7 | 2 | 0 | 6 | 2 | 0 | 5 | 2 | 0 | 4 | 2 | 0 | 3 | 2 | 0 |
| 8 | 1 | 1 | 7 | 1 | 1 | 6 | 1 | 1 | 5 | 1 | 1 | 4 | 1 | 1 | 3 | 1 | 1 |
| 7 | 3 | 0 | 6 | 3 | 0 | 5 | 3 | 0 | 4 | 3 | 0 | 3 | 3 | 0 | 2 | 2 | 1 |
| 7 | 2 | 1 | 6 | 2 | 1 | 5 | 2 | 1 | 4 | 2 | 1 | 3 | 2 | 1 | | (4) | |
| 6 | 4 | 0 | 5 | 4 | 0 | 4 | 4 | 0 | 3 | 3 | 1 | 2 | 2 | 2 | | | |
| 6 | 3 | 1 | 5 | 3 | 1 | 4 | 3 | 1 | 3 | 2 | 2 | | (6) | | | | |
| 6 | 2 | 2 | 5 | 2 | 2 | 4 | 2 | 2 | | (7) | | | | | | | |
| 5 | 5 | 0 | 4 | 4 | 1 | 3 | 3 | 2 | | | | | | | | | |
| 5 | 4 | 1 | 4 | 3 | 2 | | (9) | | | | | | | | | | |
| 5 | 3 | 2 | 3 | 3 | 3 | | | | | | | | | | | | |
| 4 | 4 | 2 | | (11) | | | | | | | | | | | | | |
| 4 | 3 | 3 | | | | | | | | | | | | | | | |
| | (13) | | | | | | | | | | | | | | | | |

| 4 Slots (72) | | | 3 Slots (54) | | | 2 Slots (36) | | |
|---|---|---|---|---|---|---|---|---|
| A | B | C | A | B | C | A | B | C |
| 3 | 1 | 0 | 2 | 1 | 0 | 1 | 1 | 0 |
| 2 | 2 | 0 | 1 | 1 | 1 | | (1) | |
| 2 | 1 | 1 | | (2) | | | | |
| | (3) | | | | | | | |

TABLE.2.

| Design No. | | 1 | 2 | 3 | 4 | 5 | 6 |
|---|---|---|---|---|---|---|---|
| Coil division per half phase | | A-B-C<br>5-1-0 | A-B-C<br>4-2-0 | A-B-C<br>4-1-1 | A-B-C<br>3-3-0 | A-B-C<br>3-2-1 | A-B-C<br>2-2-2 |
| 10-pole % Adjacent harmonic | 6-pole | 18.7 | 46.1 | 16.3 | 61.0 | 29.7 | 0.0 |
| 12-pole % Adjacent harmonic | 16-pole | 11.7 | 21.3 | 0.0 | 28.9 | 16.4 | 32.5 |
| Positive distribution (Spread) Factors; and % unbalance: negative & zero-sequence | 10-pole | 0.771<br>62.9/83.5<br>0.928<br>100/71.8 | 0.852<br>37.8/75.6<br>0.882<br>100/37.8 | 0.880<br>36.6/53.6<br>0.833<br>100/40.0 | 0.880<br>26.8/73.2<br>0.866<br>100/0.0 | 0.937<br>17.8/35.6<br>0.764<br>100/0.0 | 0.966<br>0.0/0.0<br>0.667<br>100/50.0 |
| | 12-pole | | | | | | |
| | Average | 0.850 | 0.867 | 0.856 | 0.873 | 0.850 | 0.816 |

TABLE.3.   12-SLOT ELEMENTAL 10-POLE/12-POLE P.A.M. WINDINGS.

| Design No. | | 1 | 2 | 3 | 4 |
|---|---|---|---|---|---|
| Coil division per half phase | | A−B−C<br>4−1−0−1 | A−B−C<br>3−0−−2 | A−B−C<br>3−1−−1 | A−B−C<br>2−2−−1 |
| 10-pole % Adjacent harmonic | 6-pole | 36.4 | 61.9 | 8.7 | 175.0 |
| 12-pole % Adjacent harmonic | 16-pole | 9.8 | 26.1 | 9.7 | 11.7 |
| Positive distribution (Spread) Factors; and % unbalance: negative- and zero- sequence | 10-poles | 0.917 | 0.872 | 0.800 | 0.600 |
| | | 100/65.5 | 100/22.9 | 100/25.0 | 100/100 |
| | 12-poles | 0.795 | 0.874 | 0.915 | 0.957 |
| | | 57.0/81.4 | 31.1/74.1 | 28.0/43.7 | 11.4/25.8 |
| | Average | 0.858 | 0.873 | 0.857 | 0.778 |

TABLE 4.   10-SLOT ELEMENTAL 10-POLE/12-POLE P.A.M. WINDINGS.

| Design No. | | 1 | 2 | 3 | 4 | 5 | 6 |
|---|---|---|---|---|---|---|---|
| Coil division per half phase | | A-B-C 5-1-0 | A-B-C 4-2-0 | A-B-C 4-1-1 | A-B-C 3-3-0 | A-B-C 3-2-1 | A-B-C 2-2-2 |
| 12-pole % Adjacent Harmonic | 8-pole | 26.9 | 49.1 | 52.0 | 57.7 | 86.6 | 129.9 |
| 14-pole % Adjacent Harmonic | 18-pole | 8.7 | 21.5 | 7.6 | 28.5 | 13.8 | 0.0 |
| Positive distribution (Spread) Factors; and % unbalance: negative-zero-sequence | 12-pole | 0.928 | 0.882 | 0.833 | 0.866 | 0.764 | 0.667 |
| | | 100/71.8 | 100/37.8 | 100/40.0 | 100/0.0 | 100/0.0 | 100/50.0 |
| | 14-pole | 0.771 | 0.852 | 0.880 | 0.880 | 0.937 | 0.966 |
| | | 62.9/83.5 | 37.8/75.6 | 36.6/53.6 | 26.7/73.2 | 17.8/35.6 | 0.0/0.0 |
| | Average | 0.849 | 0.867 | 0.857 | 0.873 | 0.851 | 0.817 |

TABLE.5.   12-SLOT ELEMENTAL 12-POLE/14-POLE P.A.M. WINDINGS.

| Design No. | | 1 | 2 | 3 | 4 | 5 | 6 | 7 |
|---|---|---|---|---|---|---|---|---|
| Coil division per half phase | | A-B-C 6-1-0 | A-B-C 5-2-0 | A-B-C 5-1-1 | A-B-C 4-3-0 | A-B-C 4-2-1 | A-B-C 3-3-1 | A-B-C 3-2-2 |
| 14-pole % Adjacent Harmonic | 10-pole | 21.3 | 40.4 | 3.5 | 51.7 | 66.0 | 85.1 | 99.8 |
| 16-pole % Adjacent Harmonic | 20-pole | 9.6 | 43.9 | 5.0 | 27.2 | 13.7 | 17.0 | 6.3 |
| Positive distribution (Spread) Factors; and % unbalance negative & zero-sequence | 14-poles | 0.937 | 0.892 | 0.857 | 0.869 | 0.795 | 0.756 | 0.714 |
| | | 100/76.2 | 100/48.0 | 100/50 | 100/16.4 | 100/18.0 | 100/18.9 | 100/20 |
| | 16-poles | 0.736 | 0.831 | 0.851 | 0.872 | 0.913 | 0.934 | 0.956 |
| | | 67.4/85.3 | 43.9/77.2 | 43.3/60.5 | 29.1/73.6 | 25.0/44.2 | 16.0/38.1 | 9.3/16.6 |
| | Average | 0.836 | 0.862 | 0.854 | 0.871 | 0.854 | 0.845 | 0.835 |

TABLE.6. 14—SLOT ELEMENTAL 14-POLE/16-POLE P.A.M. WINDINGS.

POLE-AMPLITUDE MODULATION POLE-CHANGING ELECTRIC MOTORS AND GENERATORS

DESCRIPTION

This invention relates to pole-amplitude modulation (P.A.M.), pole-changing, alternating current electric motors and generators.

Three-phase alternating current, pole-amplitude modulation, pole-changing, squirrel-cage electric motors and generators are well-known.

The theory of pole-amplitude modulation has been explained in various patent specifications and technical papers on the assumption that all the space-distributions of the windings and the imposed modulation waves are required to be purely sinusoidal and, hence, in practical machines are required to be as nearly sinusoidal as is possible.

It was found that sinusoidal modulation of pole-amplitude produced certain m.m.f. harmonics, particularly those harmonics which have been described as "conjugate" harmonics, which harmonics are additional to those found in conventional single-speed windings.

Part of the developing technique of pole-amplitude modulation, as it has been described in the later patent specifications and technical papers, has been concerned with the reduction of the undesired harmonics by variation of the modulation sequence or by choice of coil-grouping and chording. Those harmonics were considered undesirable, in particular, which resulted in substantial dips, or cusps, or saddles in the acceleration curve of a motor or which at least caused an overall reduction of the motor torque at successive points on the acceleration curve.

This criterion was in practice quite appropriate for small and medium sized motors because, when the performance of such motors is unsatisfactory, it is usually by reason of an unsatisfactory torque characteristic.

It has now been found that there may be present in pole-amplitude modulation machines other undesirable harmonics, the nature and importance of which has not been previously recognised. These harmonics do not greatly affect the torque characteristic of a machine, but their presence is evident because they can react with the main rotating field of the machine and set up low frequency vibration of the frame of the machine.

These harmonics arise in the process of applying sinusoidal modulation. This is partly because of the irregular coil-grouping which is inherently required, and partly because of the divergence, in practice, of the m.m.f. waveform and of the wave of modulation from their ideal sinusoidal forms.

Such harmonics are additional to the "conjugate" harmonics already referred to. They are herein described as the "adjacent" harmonics of negative rotation; that is, they are of Order as near as possible to the Order of the corresponding main field and rotate in the opposite sense. Usually, these adjacent harmonics are of Order differing by "2" from the Order of the main field. In rare cases, they are of Order differing by Unity from the Order of the main field.

The effect of such adjacent harmonics of negative rotation in causing low frequency vibration of the frame of a machine is most likely to be noticed, and is least acceptable, in large motors of high pole-numbers, although, less noticeably, the effect will still be present in small motors.

The object of the present invention is to minimise such adjacent harmonics in pole-amplitude modulation machines.

Accordingly, the invention provides a three-phase alternating current electric motor or generator for alternative pole-number operation having a pole-amplitude modulation three-phase stator winding switched to provide the alternative pole-numbers in accordance with a phase-by-phase modulation pattern or an overall modulation pattern, said pole-number switching being effected by including all coils of each phase-winding in either one or the other of two phase-winding parts, said phase-winding parts being connected together alternatively in series and in parallel in order to provide said alternative pole-numbers, and the waveform of said modulation pattern as determined by phase-winding coil grouping, approximating to a form representative of sinusoidal form with added third-harmonic content, whereby the adjacent harmonic content, as herein defined, of the m.m.f. waveform of the three-phase winding is less for both pole-numbers than for a modulation waveform of purely sinusoidal form.

Another form of the present invention provides a method of designing the stator winding for a three-phase alternating current electric motor or generator, said stator winding being adapted for switching to provide alternative pole-numbers by pole-amplitude modulation comprising selecting a stator slot-number divisible by two factors, the first factor being "6" or "18", the second factor determining the number of slots for each half of the initial winding element for said stator winding, examining all possible phase/slot-number distributions, totalling the number of said second factor, selecting that said distribution appropriate to said winding element providing the said alternative pole-numbers with the minimum content of adjacent harmonics, as herein defined, and symmetrizing said winding element once at least to provide said stator winding in a stator of said selected slot-number.

The two halves of the initial winding element must be the same, apart from signs, in order to permit the parallel/series switching, which is the characteristic manner of switching for pole-changing with P.A.M. windings.

The principle underlying the present invention is thus the addition, to the known and basically sinusoidal modulation of pole-amplitude, of an harmonic modulation specifically to reduce adjacent harmonics in the resultant m.m.f. waveform. The addition of third-harmonic is found to be specific for this purpose.

Two methods are possible in practice in applying this principle. According to the first method, a modulation waveform with added third-harmonic content is first postulated and the practically possible coil-group distributions are examined in order to approximate as closely as possible to the chosen modulation waveform.

The second method is less direct and consists of examining the m.m.f. adjacent harmonic content for initial half-winding elements having one of the few possible phase/slot-number distributions and selecting one with a low adjacent harmonic content. It will then be found that the resultant modulation waveform has the added third-harmonic content, as though provided by the first method.

The choice of method for introducing third-harmonic will be seen to be determined by the stator winding pole-numbers and slot-number. In the examples which follow herein, alternative pole-numbers which are large pole-numbers and are of the form P poles/(P=2) poles are chosen, because such machines both show the effect of adjacent harmonics most clearly and are a commercially important class of machines.

However, before the specific examples of the invention are described in detail, it will facilitate understanding of the invention to discuss the theory which those examples will reflect.

Considering, first, those radial force-waves present in all induction motors, the rotating magnetic field in all induction motors causes a rotating radial force-wave, which tends to bend the core and the frame. The force (per unit area) at any point is proportional to the square of the magnetic flux-density $B_m \sin(m\theta - wt)$, at that point; that is, to:

$$B_m^2 \sin^2(m\theta - wt) \text{ or } B_m^2 \left[\frac{1 - \cos 2(m\theta - wt)}{2}\right] \quad (1)$$

This gives a double-frequency rotating force-wave, with a pole-number equal to twice the main pole-number, in addition to the steady radial force $\frac{1}{2}[B_m^2]$, where m is the number of main pole-pairs and $\theta$ is a mechanical angle.

Considering next, the rotating force-waves in P.A.M. induction motors, suppose there is superimposed a second rotating magnetic field, $B_n \sin(n\theta \mp wt)$, of a different pole-number, the second field being weak in comparison with the main field $B_m$; less (say) than 20%. Their combined effect is to give two additional radial force-waves, besides that due to the main field. One of these force-waves is stationary, and one rotates at a speed corresponding to twice the line frequency. In principle, these additional force-waves, due to harmonics, occur in all standard induction motors, but they are very small.

The following equations will make matters clear:

Let $B_m \sin(m\theta - wt)$ and $B_n \sin(n\theta \mp wt)$ represent two rotating magnetic fields in an induction motor, where $B_m$ is very much greater than $B_n$. Where the alternative sign is negative, both fields rotate in the same direction. Where it is positive, the fields rotate in opposite directions. The total resultant rotating force wave is now proportional to:

$$[B_m \sin(m\theta - wt) + B_n \sin(n\theta \mp wt)]^2 \quad (2)$$

If $B_m$ is several times as big as $B_n$, as will always be so for any P.A.M. winding, the rotating force-wave due to $B_n^2$ acting alone can be neglected. Taking the difference between the total resultant rotating force-wave of Eqn. (2), and the force-wave of Eqn. (1) which is due to the main field $B_m$ acting alone, and ignoring the force-wave due to $B_n^2$, it follows that the extra rotating force-wave in a P.A.M. induction motor is proportional to:

$$[B_m \sin(m\theta - wt) + B_n \sin(n\theta \mp wt)]^2 - [B_m^2 \sin^2(m\theta - wt)] = \quad (3)$$
$$2B_m B_n [\cos(m \mp n)\theta - \cos((m \pm n)\theta - 2wt)]$$

Each residual magnetic field can, in principle, cause two resultants, according to this last equation. (Only resultant magnetic fields are of importance. Any harmonic m.m.f. will be much larger than the magnetic field which it produces, and even the harmonic m.m.f.'s in a P.A.M. winding will be small compared with the main m.m.f.)

The first term in this last expression (3) represents a fixed force-wave of $(m \mp n)$ pole-pairs, and the second term represents a rotating force-wave of $(m \pm n)$ pole-pairs, with a speed of revolution corresponding to twice line-frequency. In principle, the fixed force-wave will give a steady resultant distortion of the core and frame, but no resultant vibration. The second term represents a rotating force-wave, which may cause vibration.

The amount of vibration will depend on the magnitude of the force-wave, the stiffness of the frame and also on the number of poles in the force-wave. The frame may be considered as a continuous beam; simply-supported at a number of points, spaced by one pole-pitch. The deflection of a simply-supported beam of a given section, for a given force, is proportional to the cube of the distance between the supporting points; and thus the greater the number of poles the less the vibration, and vice versa.

The maximum vibration for a given strength of the second magnetic field $B_n$ will occur with the negative sign for n in the second term of the expression for the extra force-wave, giving only $(m-n)$ pole-pairs in the rotating force-wave. This corresponds to a rotation of the second field $B_n$ in the opposite direction to the main magnetic field $B_m$. At the same time, the sign in the first term will be positive, and the fixed force-wave will have $(m+n)$ pole-pairs, and the resultant fixed distortion will be trivial.

A second rotating magnetic field will thus be most likely to cause vibration, if the two fields are nearly of the same Order, and rotate in opposite senses. In principle, m and n can differ by Unity; but they will not differ by less than 2 for normal P.A.M. windings. An m.m.f. harmonic of Order differing only by Unity, 2 or other low integer from the Order of the fundamental m.m.f. has been defined herein as an adjacent harmonic.

The Orders may differ by Unity for combinations of odd numbers of pole-pairs, when all Orders of harmonic, Odd and Even, may be present for both pole-numbers. The important case is 6 poles/10 poles; other cases are rare in practice.

In earlier P.A.M. windings, special attention was paid to reducing the magnitude of any higher-Order m.m.f. harmonics (of Orders several times that of the main pole-number) because those would have a considerable effect on the speed-torque characteristics.

The principal low-Order harmonics imposed on a P.A.M. winding by the pre-modulation of the winding are of Orders $(p_1 \pm 2)$, $(p_1 \pm 4)$ etc., where $p_1$ is the original number of pole-pairs. The magnitude of these harmonics diminishes very rapidly with increase of Order. The largest adjacent harmonic before modulation is therefore of Order $(p_1 - 2)$, and is solely or predominantly of negative rotation.

Although the existence of adjacent harmonics has been known for some years, it is only with the use of P.A.M. pole-changing in large machines that the effects of vibration have to be considered as unacceptable in practice and it is only with the present invention that a general remedy has been found.

In smaller machines, the radial forces exist, but they are there less likely to cause undue vibration, because frames for small motors are usually stronger, relatively, than the frames of big motors. Even so, large adjacent harmonics may cause an appreciable increase in audible noise. For this reason it may be advantageous to use the remedy of the present invention in small motors, particularly as the remedy is simple to apply and quite small in cost.

Considering, now, the Orders of adjacent harmonics, and the direction of their rotation, these can readily be deduced, as is shown below.

The principal low-Order harmonics imposed on a P.A.M. winding by the pre-modulation of the winding are of Orders ($p_1 \pm 2$), ($p_1 \pm 4$) etc., where $p_1$ is the original number of pole-pairs. The magnitude of these harmonics diminishes very rapidly with increase of Order. The largest adjacent harmonic before modulation is therefore of Order ($p_1 - 2$), and is solely or predominantly of negative rotation.

The principal low-Order harmonics resulting from modulation arise either from the third-harmonic component of the phase m.m.f.'s, or from a third-harmonic component of the modulating wave. The (desired) resultant of modulation for close-ratio windings is of ($p_1 + 1$) pole-pairs; and the principal (undesired) harmonic resultant is thus of ($p_1 + 3$) pole-pairs, where $p_1$ is the original number of pole-pairs. Expressed in terms of the main pole-pair number ($p_2$) for a close-ratio P.A.M. winding after modulation, the principal undesired adjacent harmonic is then of Order ($p_2 + 2$), and this is also of negative rotation.

Considering, next, the effect of the squirrel-cage rotor upon the m.m.f. harmonics present in a P.A.M. induction motor, the rotating field $B_m \sin(m\theta - wt)$ set up by the main m.m.f. is the fundamental rotating magnetic field. All the remaining m.m.f. components should in principle be completely neutralized in normal operation by currents in the squirrel cage, so that ideally there should be no magnetic flux in the machine other than the fundamental field, when it is operating normally. In practice, the larger harmonic m.m.f.'s are not completely neutralized, and it is the fluxes ($B_n$), set up by these residual m.m.f.'s, which are denoted (typically) by $B_n \sin(n\theta \mp wt)$. They will always be small, because they are proportional only to the un-neutralized part of the harmonic m.m.f. It is the reactions between $B_m$ and one (or more) Order(s) of $B_n$ which can set up additional rotating magnetic force-waves.

The negatively-rotating adjacent harmonic after modulation, of ($p_2 + 2$) = ($p_1 + 3$) pole-pairs, is less likely to be fully neutralized by the squirrel cage than is the negatively-rotating adjacent harmonic of ($p_1 - 2$) pole-pairs, before modulation, for a given strength of the harmonic m.m.f. It will be observed that the Order of the adjacent harmonic for the higher speed, in close-ratio P.A.M. windings, is always greater by 5 than the Order of the adjacent harmonic for the lower speed. The ratio between these two Orders is nearer to Unity for larger pole-numbers and vice versa. For example, for 8 poles/10 poles the ratio is 2/7, whereas for 14 poles/16 poles the ratio is $\frac{1}{2}$. In consequence, adjacent harmonics are more nearly of equal significance for both speeds, for the larger pole-numbers.

SHORT DESCRIPTION OF THE DRAWINGS

In order that the invention may be clearly understood and readily carried into practice, a number of embodiments will now be described in detail, by way of example, with reference to the accompanying drawings, in which:-

Figure 4:
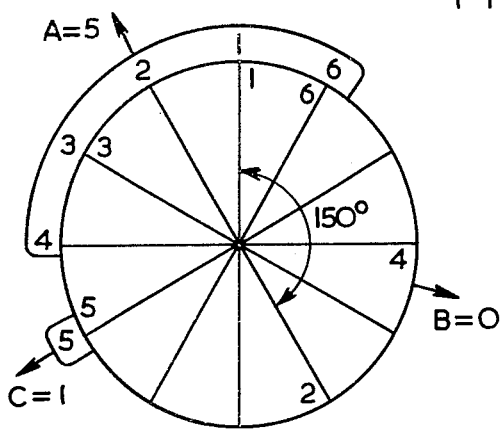
Figure 4:
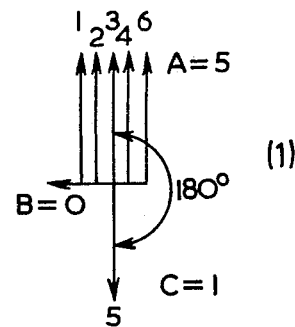
Figure 4:
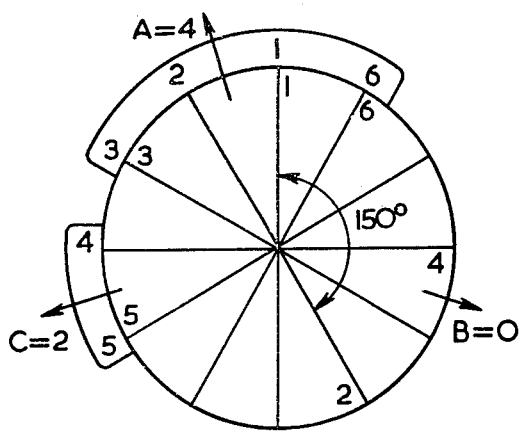
Figure 4:
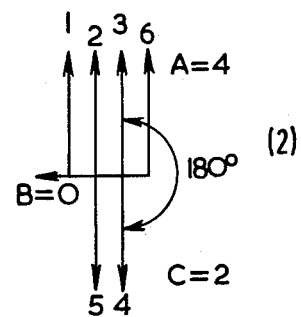
Figure 4:
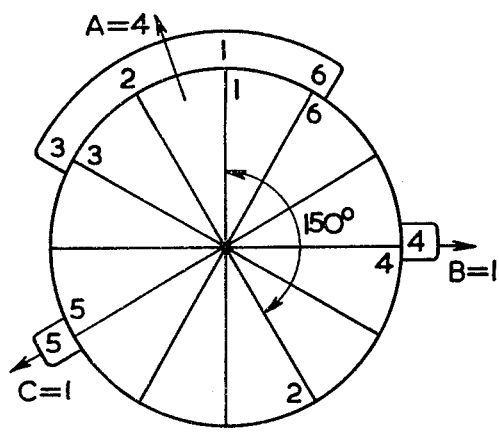
Figure 4:
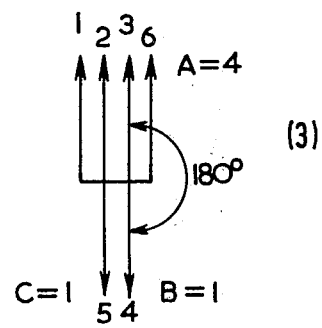
Figure 5:
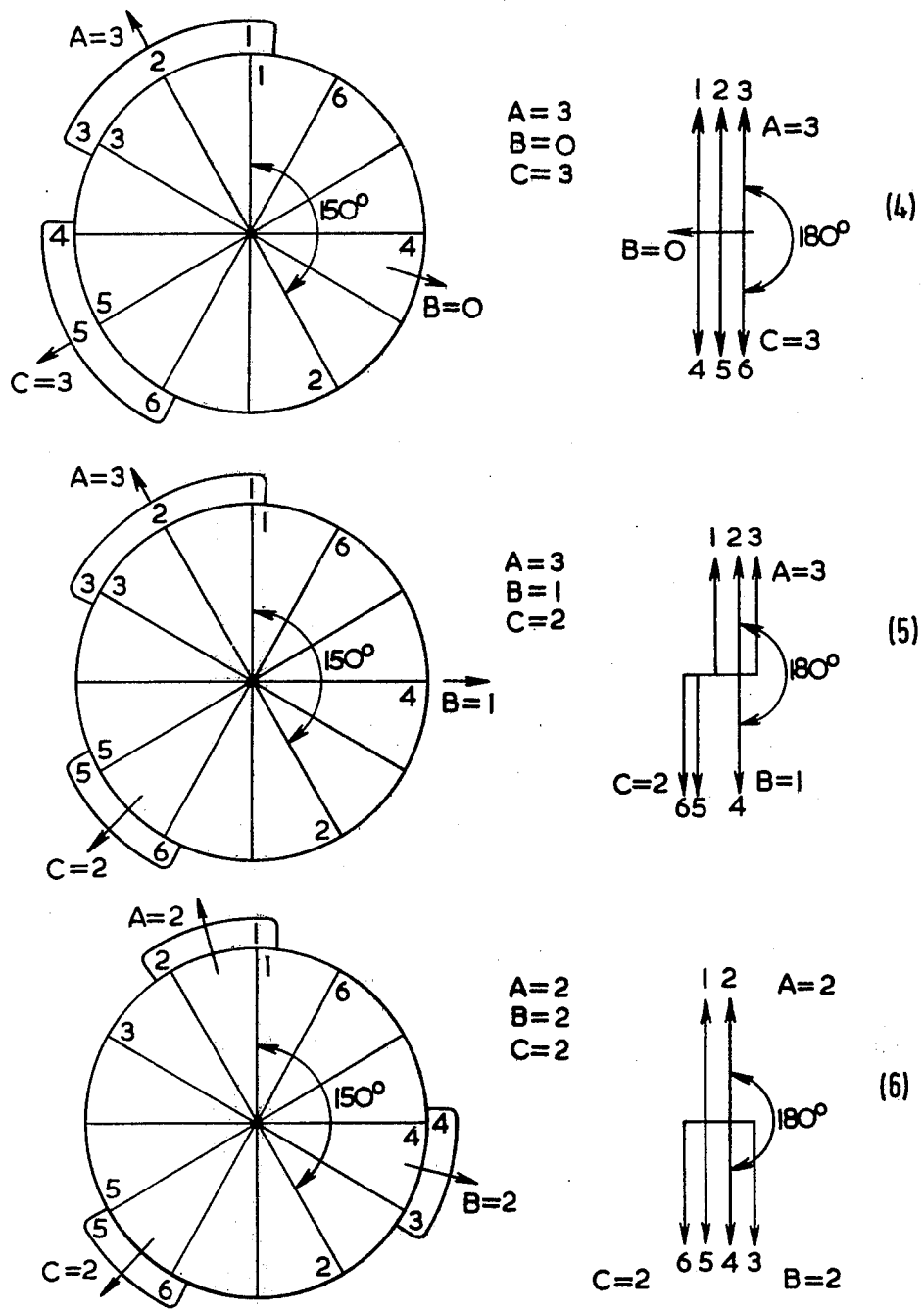
Figure 7:
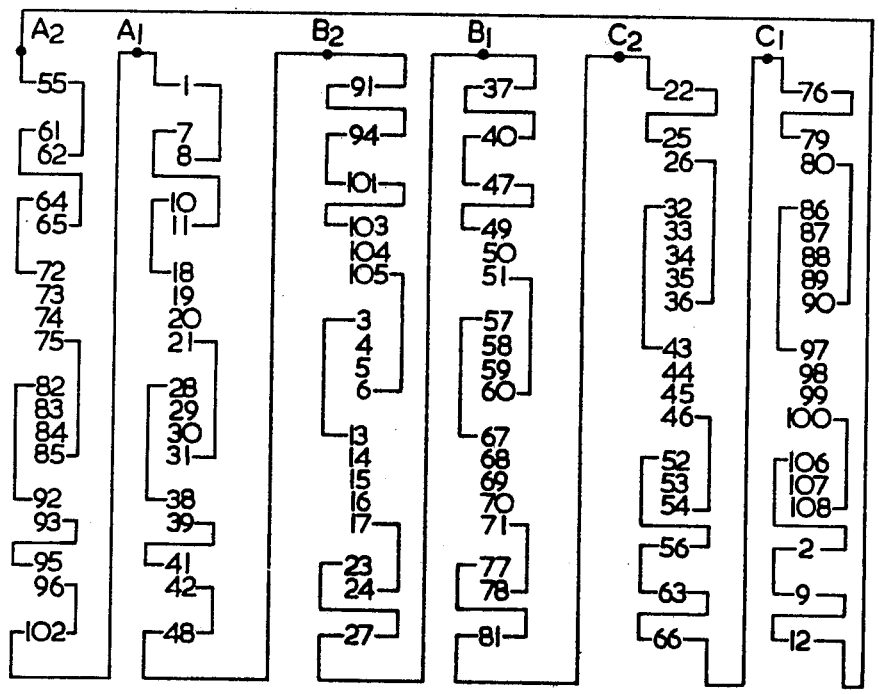
Figure 10:
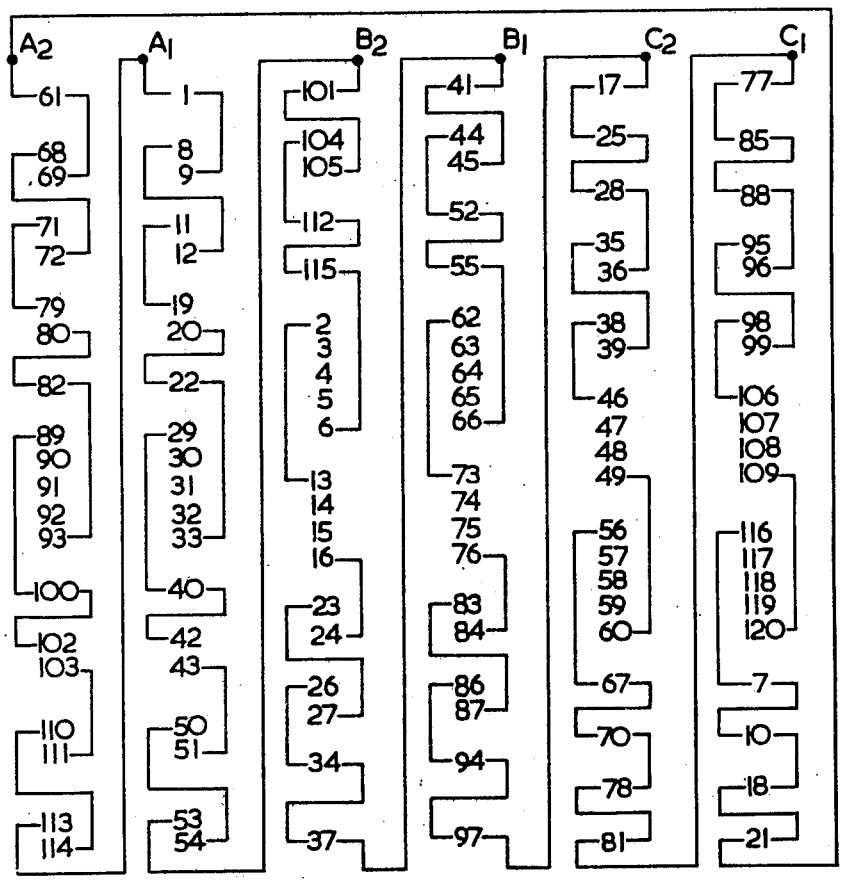
Figure 10:
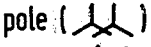
Figure 11:
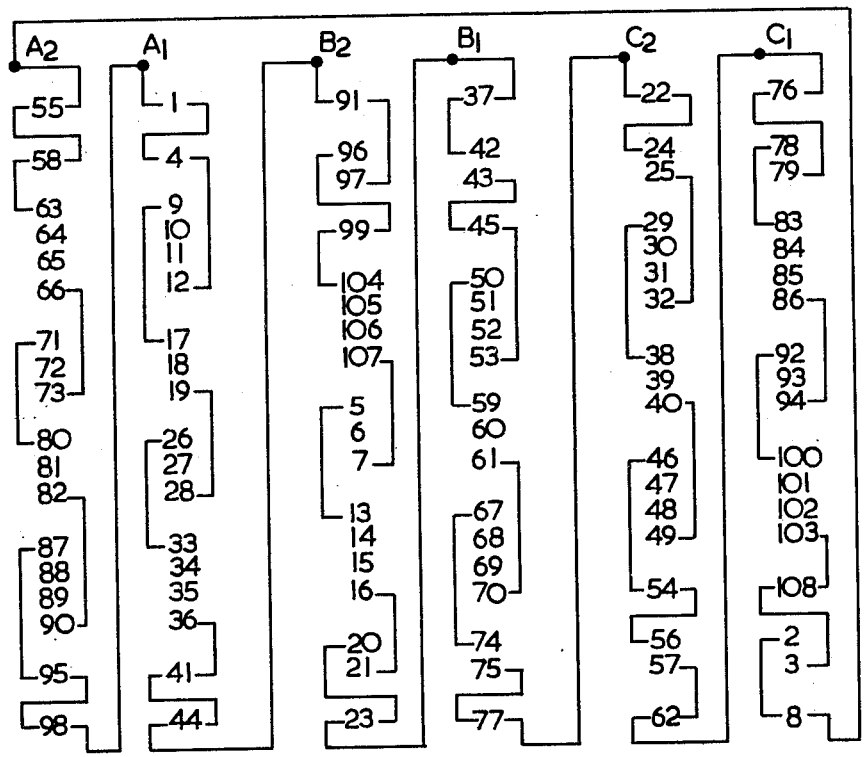
Figure 12:
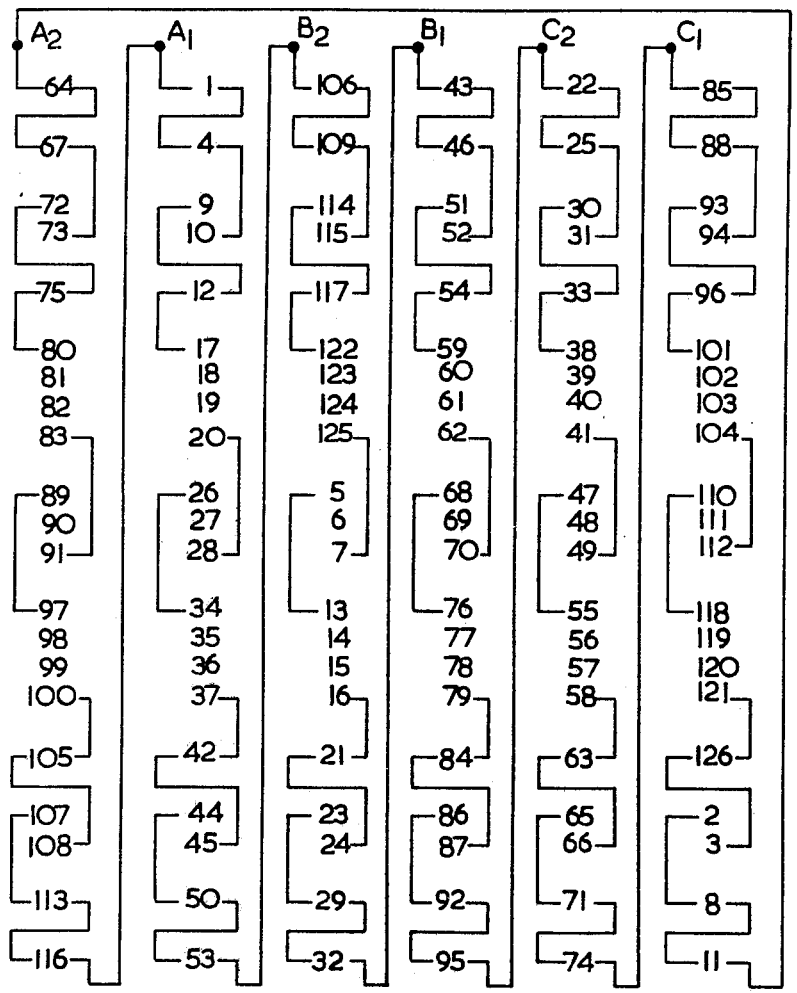
Figure 13:
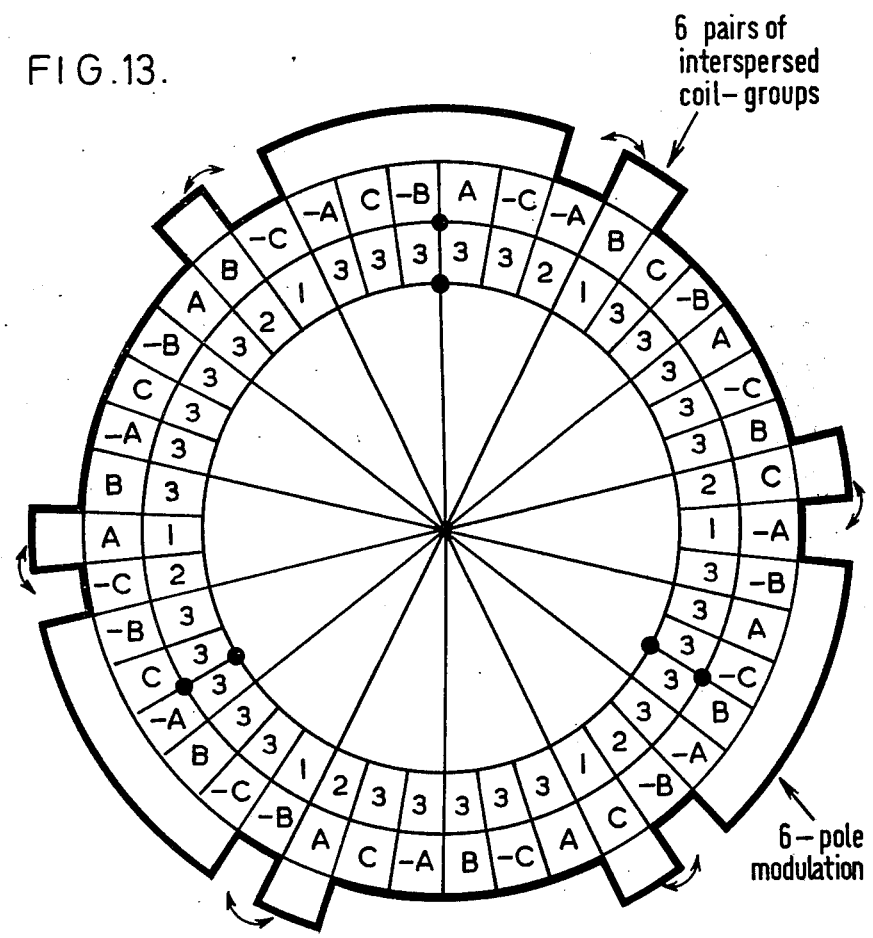
Figure 14:
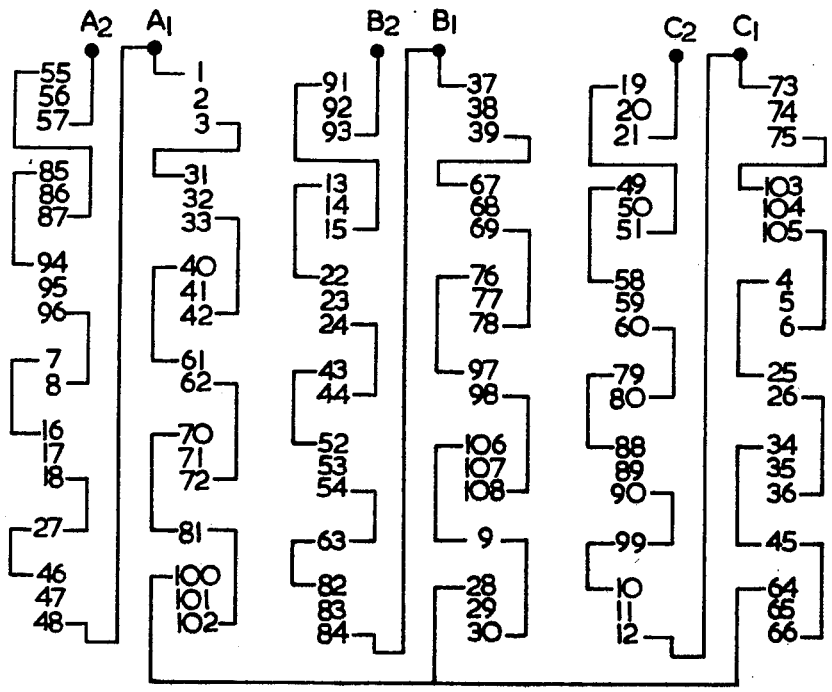

FIG. 4 together with FIG. 5 show all six possible alternative 12-slot elements suitable for a 10 pole/12 pole P.A.M. winding in 108 slots;

FIG. 6 shows the coil-groupings and coil-signs for 10 pole and 12 pole working for the six alternative 12-slot elements of FIGS. 4 and 5;

FIG. 7 is a winding diagram of one 10 pole/12 pole P.A.M. winding in 108 slots;

FIG. 8 is a winding diagram of another 10 pole/12 pole P.A.M. winding in 108 slots;

FIG. 9 shows 12-pole vector diagrams for a 40-slot winding element (a) after symmetrization and (b) after the transfer of one coil from phase C to phase B;

FIG. 10 is a winding diagram for the final preferred 10 pole/12 pole P.A.M. winding in 120 slots;

FIG. 11 is a winding diagram for a 12 pole/14 pole winding in 108 slots;

FIG. 12 is a winding diagram for a 14 pole/16 pole winding in 126 slots;

FIG. 13 is a clock diagram showing the coil-grouping for a 14 pole/8 pole winding in 108 slots; and FIG. 14 is the winding diagram for the final preferred 14 pole/8 pole P.A.M. winding in 108 slots.

SHORT DESCRIPTION OF THE TABLES

Included, for convenience, with the accompanying drawings are the following tables of which:

Table 1 tabulates corresponding values for the original (known) winding and the winding embodying the present invention for four typical slot-numbers for a symmetrical winding in 8/10 poles;

Table 2 shows typical numbers of slots, and the numbers of corresponding coils, for nine coil-group combinations showing the possible division, between the three phases, of coils per half-element of typical windings;

Table 3 shows the harmonic content produced by the six alternative 12-slot elemental 10 pole/12 pole windings, permitting a choice therefrom for a 10 pole/12 pole P.A.M. winding in 108 slots;

Table 4 shows the harmonic content produced by the four alternative 10-slot elemental 10 pole/12 pole windings, permitting a choice therefrom for a 10 pole/12 pole P.A.M. winding in 120 slots;

Table 5 shows the harmonic content produced by the six alternative 12-slot elemental 12 pole/14 pole windings permitting a choice therefrom for a 12 pole/14 pole P.A.M. winding in 108 slots; and Table 6 shows the harmonic content produced by the seven alternative 14-slot elemental 14 pole/16 pole windings permitting a choice therefrom for a 14 pole/16 pole P.A.M. winding in 126 slots.

DESCRIPTION OF THE EXAMPLES

General Theory of Harmonic Modulation

The present invention provides a general method of designing a further class of P.A.M. pole-changing windings, so as to minimise adjacent harmonics of negative-rotation. This method necessitates an intentional departure from the pure sinusoidal modulation, which has been the theoretical basis upon which the known P.A.M. pole-changing induction motors have been designed.

The theory of harmonic modulation can be applied to P.A.M. windings for any pole-combination. However, the examples given herein will be for ($p_1/p_2$) pole-pairs, where $p_1 < p_2$ and $p_2 = (p_1 + 1)$.

In practice, pole-combinations such as 4/6; 6/8; 8/10; 10/12; etc., where the pole-numbers differ by 2, have proved to be much the most important, industrially.

Modulation for such pole-combinations is usually effected, as has been established by earlier publications, by overall modulation of the stator winding, by a modulation wave equal to the sum of the alternative pole-numbers.

The general principle of harmonic modulation is that an undesirable m.m.f. harmonic can be much reduced by adding an additional component of modulation to the normal modulating wave. The particular harmonic modulation which reduces the adjacent m.m.f. harmonics is the third harmonic of the fundamental phase-modulation wave. The incidence of double-frequency vibration in large P.A.M. motors can be reduced to a very low level by the addition of a selected amount of third-harmonic modulation.

The particular principle of third-harmonic modulation is analysed for the two modes of overall modulation, as follows:

(A) Overall modulation by the sum of the pole-pairs (1) From $p_1$ pole-pairs to $p_2$ pole-pairs: $p_2 = (p_1 + 1)$

| Modulation applied | Products of Modulation | |
|---|---|---|
| | Wanted | Inherent |
| Main modulation $p_1 \pm (p_1 + p_2)$ | $- p_2$ | $+ (2p_1 + p_2)$ |
| Third harmonic $p_1 \pm 3$ modulation | $+ (p_1 + 3)$ $= + (p_2 + 2)$ Reduced low-Order Adjacent harmonic. Desired. | $+ (p_1 - 3)$ Increased low-Order sub-harmonic. Acceptable. |

Conversely, taking modulation in the reverse sense:
(2) From $p_2$ pole-pairs to $p_1$ pole-pairs: $p_1 = (p_2 - 1)$

| Modulation applied | Products of Modulation | |
|---|---|---|
| | Wanted | Inherent |
| Main modulation $p_2 \pm (p_1 + p_2)$ | $- p_1$ | $+ (2p_2 + p_1)$ |
| Third-harmonic $p_2 \pm 3$ modulation | $+ (p_2 - 3)$ $= + (p_1 - 2)$ Reduced low-Order Adjacent harmonic. Desired. | $+ (p_2 + 3)$ Increased high-Order harmonic. Acceptable. |

The directions of rotation of all the harmonics are opposite to the direction of rotation of the main field, in both the cases above. In particular, the adjacent harmonics are of negative rotation.

Except in symmetrical P.A.M. windings, m.m.f. harmonics are generally unbalanced. Adjacent harmonics will have both positive and negative sequence components, but the negative-sequence component is much the larger. The positive-sequence component reflects second-order differences between the coil-groupings of the individual phases.

Phase-Modulation

This logic has been established on the basis of overall modulation of the stator winding, but it is equally applicable to phase modulation. The phase-modulation wave, in close-ratio modulation, is of 2 poles and the third-harmonic wave is thus of 6 poles. The spacing between the three phase-modulation waves in a close-ratio P.A.M. winding is $2\pi/3$, and their third-harmonic components are thus spaced by $2\pi$: that is, they are electrically coincident. If the third-harmonic modulating components are impressed on the phase modulating waves, a third-harmonic modulation will therefore have been impressed on the winding as a whole.

Returning to consideration of overall modulation (B) Overall modulation by the difference of the pole-pairs The same logic applies equally to overall modulation by the difference of the pole-numbers. An example is given later herein for a winding for 8 poles/14 poles. This is a symmetrical P.A.M. winding for which overall modulation by 6 poles, which is the difference of the alternative pole-numbers, is used. The harmonic modulation which is needed to correct the adjacent harmonic is the third-harmonic of 6 poles; that is, 18-pole harmonic modulation. The only change arising in the numerical relationships is that the adjacent harmonic for 14 poles is of 10 poles; that is 4 poles less than the main pole-number instead of 4 poles greater.

Alternative P.A.M. Windings with Added Third-Harmonic Modulation

As has been explained above, when double-frequency vibration is present, in large motors, it is due to the adjacent harmonic content in the m.m.f. waveform. The addition of a third-harmonic component in the modulation waveform reduces and can eliminate the adjacent m.m.f. harmonics of Orders ($p_1 - 2$) and ($p_2 = 2$), in close-ratio P.A.M. windings for $p_1/p_2$ poles.

Before describing the practical winding examples, it is necessary to consider the two classes of P.A.M. pole-combinations as follows:

Symmetrical P.A.M. pole-combinations, for which neither alternative pole-number is a multiple of "3"; and Asymmetrical P.A.M. pole-combinations, for which one of the alternative pole-numbers is a multiple of "3" and the other is not.

Symmetrical P.A.M. windings

In the first class, the coil-groupings for all the phases are always identical. It is therefore possible to re-group the coils of all the phases in the same way, and the windings will remain balanced for both speeds, whatever coil-grouping is chosen. Normally, the coil-grouping has to be restricted to low integral values because, in practice, all coils must be identical, and the number of coils/pole/phase must be low.

A third-harmonic component can be added to the modulating wave by reducing the number(s) of coils in the centre group(s) of each half phase-winding, and increasing the number(s) of coils in the outer group(s).

In Table 1 there are set out eight alternative 8 pole/10 pole symmetrical P.A.M. windings comprising two alternative windings for each of four stators with different slot-numbers. Of the two alternative windings, the first is a known 8 pole/10 pole winding, of design based upon sinusoidal modulation and the second winding represents the one with added third-harmonic modulation. The characteristics of all eight windings are tabulated and it will be seen that the adjacent harmonic m.m.f. content is much reduced for the second alternative winding in each corresponding stator, that winding with added third-harmonic modulation.

It is to be noted that the coil-pitch is the same for both windings of each pair.

Figure 1:
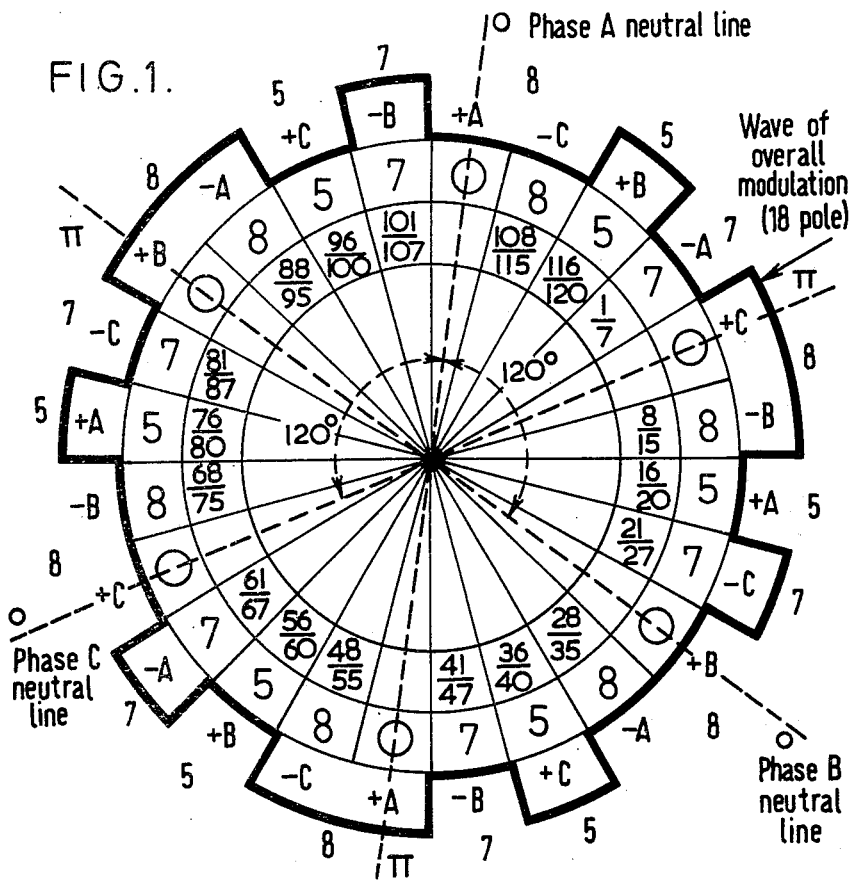
FIG. 1 is a winding layout and total modulation diagram for an 8 pole/10 pole symmetrical P.A.M. winding in 120 slots, with two phantom coil-groups per phase.

FIG. 1 shows the winding layout and overall modulation diagram for the 8 pole/10 pole P.A.M. winding in a 120 slot stator having the same coil-grouping:

7 - 5 - 8 - 0 - - Repeat for each phase, that is providing two phantom coil groups "0" for each phase. This is the fourth winding shown in Table 1 and there indicated by "*".

As shown in FIG. 1, the overall modulation wave, indicated by an arrow, is 8+10=18-pole. The winding shown is 8-pole and is modulated to 10-pole by reversal in current-carrying sense of those coil-groups which lie inside the modulation wave which embraces the phase-bands in the outer ring of the "clock" diagram. This 18-pole wave is 8 - 5 - 7 - 8 -5 -7 - - Repeat - - Repeat coils per pole.

The middle ring denotes the number of coils in each coil-group. The inner ring denotes the slot numbers.

The coil pitch is 10 slots, e.g., slot 1 to slot 11, throughout.

The winding connections are:
8-poles—Parallel-Star
10-poles—Series-Delta

For 8 pole/10-pole windings the adjacent harmonics are 4-poles and 14-poles respectively.

Table 1 shows the adjacent harmonic m.m.f. content, the value of R=(x+z)/2y where: x - y - z - 0 defines the half-phase coil-grouping, the two winding factors and the air-gap flux-density ratio for the winding of FIG. 1 and for the three other "third-harmonic" windings and the four known windings corresponding.

It will be noted that the adjacent harmonic of 14-poles for the 10-pole connection is reduced to about one-fifth in the third-harmonic winding compared with the corresponding known winding and the adjacent harmonic of 4-poles for the 8-pole connection is reduced to about one-half. Of these, the 14-pole adjacent harmonic is the more likely to produce double-frequency vibration, which will be in the 10-pole connection of the winding.

Figure 2:
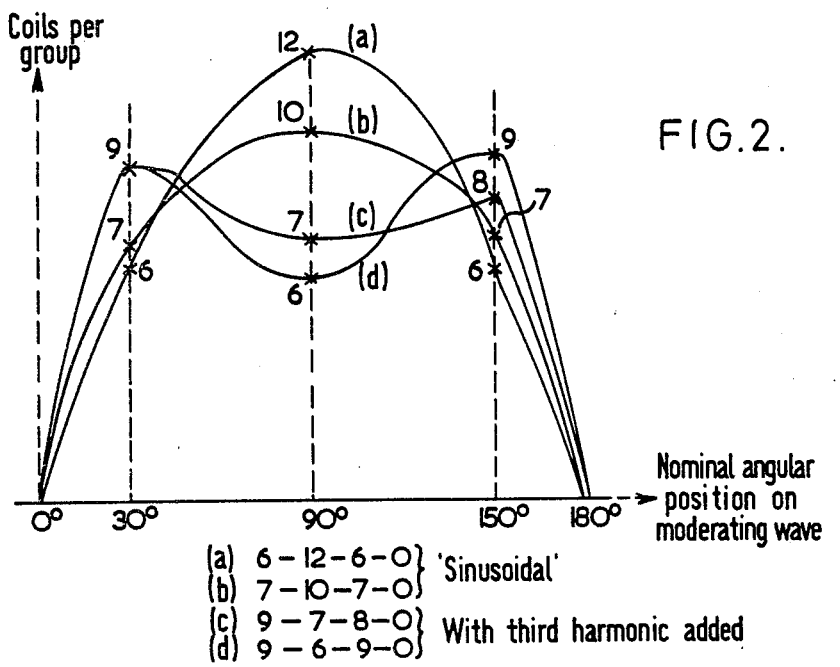
FIG. 2 shows four graphs, for 8 pole/10 pole windings, relating the number of coils per coil-group and nominal angular position on the modulating wave.

FIG. 2 shows four coil-grouping diagrams relating to 8-pole/10-pole windings in 144 slots, two of these windings, referenced (b) and (d), being similarly referenced in Table 1.

As shown in FIG. 2, the coil-grouping of known 8-pole/10-pole windings, corresponding to "sinusoidal" modulation, would be:

(a) 6 - 12 - 6 - 0 - - Repeat or
(b) 7 - 10 - 7 - 0 - - Repeat for each phase.

The alternative coil-grouping, representing added third-harmonic modulation, is:

(c) 9 - 7 - 8 - 0 - - Repeat or
(d) 9 - 6 - 9 - 0 - - Repeat for each phase.

As previously explained, the addition of third-harmonic modulation corresponds to increasing the number of coils in two outer coil groups and decreasing the number of coils in an intermediate coil group. The shape of the curves (c) and (d) of FIG. 2 exhibits recognizable distortion of the more sinusoidal (half-wave) shapes of the curves (a) and (b).

The m.m.f. harmonic content corresponding to these coil-grouping examples is readily evaluated by computer. For the 8-pole/10-pole winding in 144 slots, the coil-grouping examples (b) and (d) would be chosen for the "sinusoidal" and "third-harmonic" modulation examples and these two are included in Table 1.

The other examples of Table 1 represent the same logic and have been selected by the same m.m.f. analysis.

Finally, the winding diagram, for any required 8-pole/10-pole winding, for any permissible slot number from 72 slots upwards can be readily prepared using the logic described.

Figure 3:
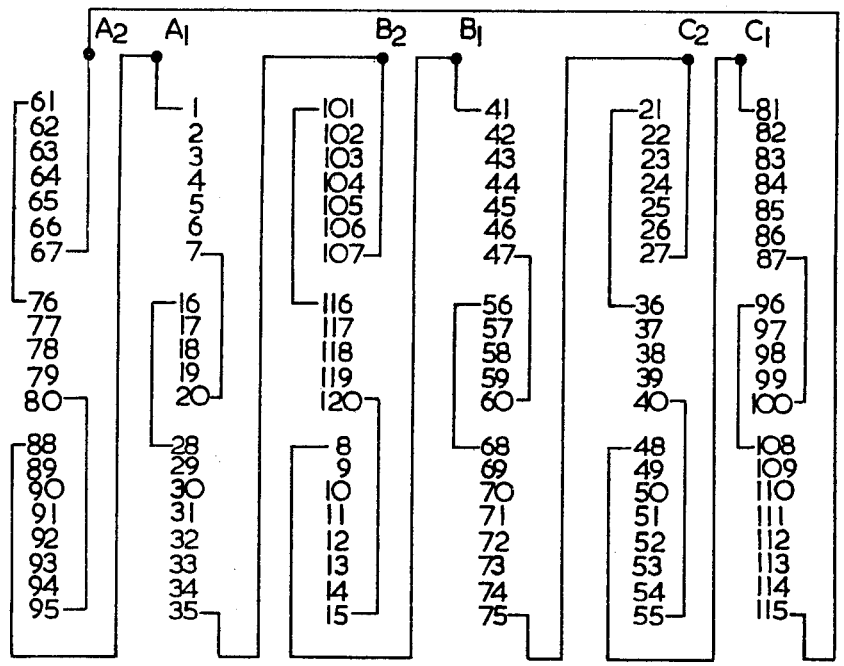
FIG. 3 is a winding diagram of the preferred 8 pole/10 pole winding in 120 slots.

FIG. 3 shows, as a particular example, the third-harmonic modulation winding form for an 8-pole/10-pole winding in 120 slots using the coil-grouping: 7 - 5 - 8 - 0 - - Repeat, inserted in the clock diagram of FIG. 1, and indicated by the "*" in Table 1. Table 1 also lists the reduced adjacent harmonic content.

If each half phase-winding of any winding designed is represented: x - y - z - 0, then the average ratio (R) given by (x+z)/2y is, for the 120 slot windings, 0.75 for the "sinusoidal" winding and 1.5 for the "third harmonic" winding.

Table 1 sets out four examples of "third harmonic" windings for 8-pole/10-pole machines. Exactly the same design method can be applied for other symmetrical P.A.M. pole-combinations such as 14-pole/16-pole and 8-pole/14-pole machines.

With stators of the slot-numbers normally used, the numbers of coils per coil group are fewer for large pole-numbers than for small pole-numbers. With the necessary limitation, in the change of coil-grouping to provide third-harmonic modulation, of moving integral numbers of coils from a central coil group to outer coil groups, the optimum curve shape, see FIG. 2, is not always obtainable. It may sometimes be preferred to use, for symmetrical P.A.M. pole-combinations, the design method later described herein as applicable to asymmetrical P.A.M. pole-combinations, thus departing from simple lumped coil-grouping.

The examples described above with reference to Table 1 are symmetrical P.A.M. windings using sum overall modulation, that is the (fundamental) modulation wave applied overall to the three-phase winding has a number of poles equal to the *sum* of the alternative pole-numbers.

There is a second sub-class of symmetrical P.A.M. windings using different overall modulation, that is the (fundamental) modulation wave applied overall has a number of poles equal to the *difference* of the alternative pole-numbers.

A similar logic is applied.

Taking as example an 8-pole/14-pole winding, difference overall modulation is to be preferred because (14−8) is 6, which is a multiple of "3", whereas (14+8) is 22, which is not a multiple of "3".

Numerically, the Orders of the adjacent harmonics is changed by the choice, but the principle of added third-harmonic modulation to reduce the adjacent harmonic content is unchanged.

Continuing with the 8-pole/14-pole example, the winding provides 8 poles when unmodulated and (8±6) poles when modulated, that is 14-poles, the required pole-number and 2-poles as an acceptable subharmonic.

The adjacent harmonic for 14 poles is of 10 poles. The difference of Orders is still 2, but in this case of lower Order than the working pole-number of 14 poles.

Third-harmonic modulation provides $(8 \pm 3 \times 6)$ poles $= (8 \pm 18)$ poles $= 10$ poles, equal to the adjacent harmonic and 26 poles, a high-Order harmonic which can be reduced by chording.

By choice of the amount of third-harmonic modulation added, the resultant adjacent harmonic in the 14-pole m.m.f. waveform can be reduced to a low value.

For the 8-pole connection, the adjacent harmonic is of 4-poles, as it would be for a machine using sum overall modulation. The 8-pole adjacent harmonic of 4-poles is similarly reduced by the third-harmonic modulation.

Asymmetrical P.A.M. Windings

Although the same principle of added third-harmonic modulation to reduce adjacent m.m.f. harmonics is applied also to asymmetrical P.A.M. windings, the principle is more difficult to apply in practice. Although in practical machines the fundamental m.m.f.'s will be balanced between phases, the m.m.f. harmonics are usually unbalanced, for any Order of harmonic. Further, the coil-grouping of one of the three phases differs from that of the other two.

The design process for an asymmetrical P.A.M. winding, in a stator of n-slots, usually 72 or more slots, starts with the choice of an initial winding element. This winding element will occupy only a few slots, say 2 to 10 slots, per half-element. There follows one or two stages of symmetrization by which, in the first stage, the initial winding element is triplicated, with a relative displacement between elements. Similarly, for the second stage, the first stage resultant winding is triplicated with a relative displacement between the component windings.

Hence, this design process starts with a winding element of n/9 slots or n/18 slots per half winding-element. As for all P.A.M. windings, each phase-winding must have two equal half phase-windings, so that series/parallel switching with 6 terminals is possible.

So far, the discussion is a summary of published P.A.M. design theory.

Table 2 lists all divisions of total coils between the phases per half-element, for an initial three-phase winding element, likely to be used in practice. All are n/18 slots per half winding-element. The alternatives are tabulated under element/stator slot numbers varying from 2/36 to 10/180, respectively. The number of options, for each stator slot-number, is shown in brackets at the foot of the respective column.

It may be mentioned here that the invention as applied to asymmetrical P.A.M. windings is not limited to stators of slot-number divisible by "18". In the examples which follow, one example, that of FIG. 11, uses a stator of 120 slots. Nevertheless, it is generally preferred, for asymmetrical windings, that the slot-number is divisible by "18".

In considering Table 2, it is to be noted that earlier P.A.M. theory assumed that the coils of any half winding-element should be divided between the three phases either:

(1) equally between the phases, or
(2) as nearly equally as possible, or
(3) equally between two phases, the third phase having zero coils.

This assumption is untrue and, for all but the lowest slot-number, Table 1 includes coil divisions which are unequal between phases, but which provide satisfactory windings after successive symmetrization.

Every m.m.f. harmonic in an initial winding element is reduced at each stage of symmetrization by a factor which is invariant for each particular harmonic. The fundamental is virtually unchanged. Consequently, the final m.m.f. harmonic content depends upon the harmonic content of the initial winding-element and the number of stages of symmetrization.

For any particular harmonic, that half winding-element which has the lowest content of that harmonic initially, will similarly have the lowest content finally, for the same number of symmetrization stages. The first step in minimising any particular m.m.f. harmonic in a final winding is the selection of a half-element with low initial content of that harmonic.

An elementary P.A.M. winding is obtained by the usual slot-vector method, for each possible division of the total coils between phases.

For example, as shown in Table 2, there are 6 options, regardless of the pole-combination required.

FIGS. 4 and 5 together show the slot-vector diagrams for all six options using a 108-slot stator. Considering a 10-pole/12-pole winding, the slot angle is 150° electrical for 10 poles and 180° for 12 poles. Having drawn the slot-vector diagram for each pole-number, it remains only to distribute the total coils between the phases, in accordance with the options (6) shown in Table 2, to provide the highest possible distribution factor for each pole-number, while ensuring that the phase-sequences are opposed, for the two pole-numbers, for sum modulation.

From each vector diagram of FIGS. 4 and 5, the corresponding winding layout for the 12-slot full winding element will be evident.

FIG. 6 gives the winding layout in 12 slots for each of the six 108-slot options of Table 2.

Computer analysis of each of these winding-layouts shows the harmonic content associated with each.

Table 3 sets out the phase coil-division, the adjacent harmonic content, and other winding characteristics for both of the operating pole-numbers and for each of the six options of Table 2. That elemental winding is selected which contains minimum adjacent harmonics, particularly at the higher operating pole-number. In this case, the selection is particularly of minimum 16-pole adjacent harmonic in the 12-pole winding connection. In this case, therefore, the option selected is referenced "Design No. 3" in the heading of Table 3, the coil division being: 4 - 1 - 1 per half phase.

After selection of the preferred option from Table 3, the elemental winding would be symmetrized twice. In the present case, the elemental winding in 12 slots thus provides the final winding in 108 slots.

It is possible, as an alternative method, to symmetrize twice all six of the 12-slot options and to base selection on the adjacent harmonic content of the six resultant 108-slot windings. Choice is based primarily upon low adjacent harmonic content at the higher pole-number, as vibration is more likely for this connection of a P.A.M. winding.

It is consistent that choice of the lowest adjacent harmonic content for the higher pole-number provides an acceptably low, if not the lowest, adjacent harmonic content for the lower pole-number, as may be noted from examination of Tables 3-6.

Such examination will also show that, for any elemental half-winding in S slots, the preferred option usually follows from a division of coils between the three phases in the manner: $A=(S-2)$; $B=1$; $C=1$.

A highly satisfactory final winding in all respects is provided by the method of the invention described, for achieving low adjacent harmonic content, when that choice can be made consistently with other, and known, design requirements to provide also such a final winding in which:

1. The pole-number combination and the stator slot-number chosen permit of substantial balance between phases, in both pole-number connections;
2. The content of other harmonics is low, at both pole-numbers, after the choice of coil-pitch; and
3. The coil-pitch chosen and the distribution factors give a suitable air-gap flux-density ratio.

Accordingly, it is convenient to list, in addition to adjacent harmonic content, the two distribution factors and the inherent unbalance, both negative and zero sequence, for all the winding elements of all Tables 3–6.

Description of Practical Final Windings

There follows a detailed description of six P.A.M. windings with reduced adjacent harmonic content due to added third-harmonic modulation content as follows:

1. 10-pole/12-pole in 108 slots—FIGS. 4–7;
2. 10-pole/12-pole in 108 slots—FIG. 8;
3. 10-pole/12-pole in 120 slots—FIGS. 9, 10;
4. 12-pole/14-pole in 108 slots—FIG. 11;
5. 14-pole/16-pole in 126 slots—FIG. 12;
6. 8-pole/14-pole in 108 slots—FIGS. 13, 14.

These six examples are given to illustate typical industrial requirements in large induction motors. Choice of pole-combination and choice of stator slot-number is in no sense limited to the choice in these examples.

EXAMPLE 1—10 poles/12 poles in 108 slots

FIG. 7 is the winding diagram of the first example of this pole-combination and stator slot-number.

The design of a low adjacent harmonic P.A.M. winding of this pole-combination and slot-number has already been discussed herein with reference to Tables 2 and 3 and to FIGS. 4 and 5 and FIG. 6.

In summary, the slot-number chosen, indicates a choice of elemental winding from Column 5 (108-slots) of Table 2. Of the six 6-slot elemental alternatives of Table 3, Design Nos. 1, 5 and 6 are, by inspection, unsatisfactory as providing high adjacent harmonic content for one pole-number or the other. Of the remaining three options, Design Nos. 2, 3 and 4, Design No. 3 has the lowest adjacent harmonic content, in particular the critical 16-pole harmonic for the 12-pole connection is zero.

It is to be noted that the content of 6-pole harmonic for the 10-pole connection is satisfactory and, in this particular case, the distribution of the 6 coils between phases is: $A.(6-2)$; $B.1$; $C.1$.

Considering the requirement of a balanced winding at 10 poles and at 12 poles, the unbalance due to errors in the symmetrizing angles is very small for the 10-pole parallel-star connection and balance is exact for the 12-pole series-delta connection.

FIG. 7 is the winding diagram of the first example, and is derived by using $\pm 25$ slots for the final (second) symmetrization. The coil-pitch is 8 slots throughout. The direction of rotation is opposite, for the alternative pole-numbers, with the same supply sequence. The 6-pole adjacent harmonic in the 10-pole connection is 8%. The 16-pole adjacent harmonic in the 12-pole connection is zero, as for the elemental winding. The winding factors are $W_{10}=0.798$ and $W_{12}=0.787$. The air-gap flux-density ratio $(B_{10}/B_{12})=0.95$.

EXAMPLE 2—10 poles/12 poles in 108 slots

FIG. 8 is the winding diagram of the second example, and is derived by using $\pm 14$ slots for the second symmetrization. The coil-pitch is 8 slots throughout and the direction of rotation is opposite for the 10-pole parallel-star connection and the 12-pole series-delta connection, with the same supply sequence for both. The 6-pole adjacent harmonic in the 10-pole connection is now 10%. The 16-pole adjacent harmonic in the 12-pole connection is still zero. The winding factors are $W_{10}=0.796$ and $W_{12}=0.788$. The air-gap flux-density ratio $(B_{10}/B_{12})=0.953$.

Against the small increase of adjacent harmonic content at 10 poles, compared with the winding of FIG. 7, the winding of FIG. 8 provides the requirement of only 36 coil-groups, compared with 48 coil-groups for the winding of FIG. 7.

To show the adjacent harmonic improvement of both examples of this pole-combination and slot-number, corresponding figures for a known 10-pole/12-pole winding in 108 slots, based upon the former design principle of sinusoidal modulation, are set out below:

6-pole adjacent harmonic at 10 poles—38%
16-pole adjacent harmonic at 12 poles—22%
Winding factors $W_{10}=0.796$; $W_{12}=0.819$
Air-gap flux-density ratio $(B_{10}/B_{12})=0.99$
Number of coil-groups=26.

From this comparison it is seen that, for increase in the number of coil groups from 26 to 48 (FIG. 7), or to 36 (FIG. 8), the adjacent harmonics are greatly reduced, with only trivial changes of the other characteristics.

Although similar comparison values are not given herein for the other pole-combination and slot-number examples, the reduction in adjacent harmonic content is substantial for all the examples given, compared with earlier windings for the same pole-combination and slot-number, based on the earlier design principle using more nearly sinusoidal modulation.

EXAMPLE 3—10 poles/12 poles in 120 slots

Before describing this example, it will be convenient to recall the design procedures used herein but disclosed in earlier publications called "symmetrization" and "part-symmetrization" or "2-component symmetrization".

As applied to the design of 3-phase P.A.M. windings, if a 3-phase, unbalanced elemental winding, in a submultiple number of slots, is triplicated with changes of phase and with the appropriate displacements between each of the three components, then the resultant composite winding must be balanced between phases. The composite winding occupies 3 times the number of slots as the elemental winding.

In a pole-changing machine, that number of slots in displacement which provides exactly the correct phase displacement for one pole-number results in a different angular displacement at the other (or any other) pole-number. The resultant balance is achieved at one pole-number only, therefore.

However, by further triplication of the composite winding, in a second stage of symmetrization, a slot-number displacement may be possible which provides balance, or near balance, for the second pole-number.

This final winding occupies 9 times the number of slots as the elemental winding.

In circumstances where triplication of a partially-designed winding is not practicable, the duplication of that winding, with a chosen slot-number displacement between the components, will nevertheless provide some improvement in balance, for both pole-numbers, or for the second pole-number, according to whether this is a first stage or a later stage of "symmetrization". This has been called "part symmetrization" or "2-component symmetrization". The resulting winding occupies twice as many slots as the starting winding.

It will be recalled that, in the design of P.A.M. windings, elemental windings are considered in terms of half-windings, in order that simple series/parallel switching is practicable. Obviously, the full elemental winding occupies twice the number of slots as the half-winding.

It follows, then, for any given stator slot-number, that if the slot number is not divisible by "18", two stages of symmetrization are not possible.

The stator slot-number of "120" has been chosen as an example. This slot-number has factors: $2 \times 2 \times 2 \times 3 \times 5$. The factor "3" indicates the possibility of symmetrization with a half-winding element in 20 slots. This itself can be derived from a 5-slot elemental winding twice part-symmetrized into $5 \times 2 \times 2 = 20$ slots.

Table 2 shows the 5-slot half-winding options to be 4 in number.

Table 4 lists the characteristics of all these four 5-slot elemental 10 pole/12 pole half-windings.

From inspection, it is immediately clear that option No. 3, of the phase coil-division form: $A=(5-2)$; $B=1$; $C=1$, is to be preferred as having minimum adjacent harmonic content at both pole-numbers and good balance, particularly for a 12-pole delta connection. This option is then twice part-symmetrized into a 20-slot half-winding element, ready for final symmetrization into 120 slots for the full winding.

With a 120-slot stator, exact balance can thereby be obtained for 10 poles, but not for 12 poles. However, although only the one stage of symmetrization is possible, another expedient is available to imprve balance at 12 poles.

FIG. 9 shows at (a) the vector diagram of the 20-slot half-winding result of double part-symmetrization, which is of the phase coil-division form: $A=6$; $B=6$; $C=8$.

FIG. 9 shows at (b) the resultant vector diagram after transfer of Coil 11, by reversal. This gives a resultant half-winding of the form: $A=6$; $B=7$; $C=7$.

The consequential change in the 10-pole vectors, not shown, is small and acceptable in view of the 12-pole improvement.

FIG. 10 is the winding diagram of the final 10 pole/12 pole P.A.M. winding in 120 slots.

The coil-pitch is 13 slots, that is slot 1 to slot 14.
The 6-pole adjacent harmonic at 10 poles is 12.2%.
The 16-pole adjacent harmonic at 12 poles is 0.9%.
The winding factors are $W_{10}=0.755$ and $W_{12}=0.783$.
The air-gap flux-density ratio $(B_{10}/B_{12})=1.00$.

The residual unbalance at 12 poles is 0.6% negative-sequence and 0.3% zero-sequence. The number of coil-groups, at 66 coil-groups, is larger than for any of the 108-slot examples of the same pole-combination.

EXAMPLE 4—12 poles/14 poles in 108 slots

Divisibility of the slot-number by "18" suggests twice symmetrizing a 12-slot winding element.

Table 2 shows the 6-slot half-winding element options to be six in number.

Table 5 sets out the winding characteristics for all six options.

Options Nos. 1, 5 and 6 will be discarded, as the winding factors are most unequal. Of the remaining options Nos. 2, 3 and 4, option No. 3 is the clear choice and is of the phase coil-division form: $A=(6-2)$; $B=1$; $C=1$.

FIG. 11 is the winding diagram of the twice-symmetrized final 12-pole/14-pole P.A.M. winding in 108 slots. The coil-pitch is 8 slots. The 8-pole adjacent harmonic at 12 poles is zero. The 18-pole adjacent harmonic at 14 poles is 5.6%. The winding factors are $W_{12}=0.788$ and $W_{14}=0.868$. The air-gap flux-density ratio $(B_{12}/B_{14})=1.09$. The winding is exactly balanced at 12 poles. The unbalance at 14 poles is 0.1% negative-sequence and 0.2% zero-sequence. The final number of coil-groups is 48.

EXAMPLE 5—14 poles/16 poles in 126 slots

This example is given of a P.A.M. winding for a symmetrical pole-combination which however is derived using the design method described above, which method although obligatory for asymmetrical pole-combinations is available as an alternative design method for symmetrical pole-combinations.

The slot-number 126, having the factors $2 \times 3 \times 3 \times 7$, suggests twice-symmetrizing a 7-slot elemental half-winding.

Table 2 shows the 7-slot options to be seven in number.

Table 6 sets out the winding characteristics for all seven options.

Inspection shows that option No. 3 of the phase coil-division form: $A=(7-2)$; $B=1$; $C=1$, gives the lowest adjacent harmonic content for both pole-numbers, together with nearly equal distribution factors.

Unbalance in the elemental 7-slot half-winding is of no account because, with the slot-number of 126 and pole-combination 14 poles/16 poles, double symmetrization can provide exact balance for both pole-numbers.

FIG. 12 is the winding diagram of the resultant 14-pole/16-pole P.A.M. winding in 126 slots. The coil pitch is 7 slots, although other pitches are permissible. The 10-pole adjacent harmonic at 14 poles and 20-pole adjacent harmonic at 16 poles are negligible. The winding factors are $W_{14}=0.773$ and $W_{16}=0.838$. The air-gap flux-density ratio $(B_{14}/B_{16})=1.09$. Winding balance is exact for both pole-numbers. The number of coil-groups is 66.

EXAMPLE 6—8 poles/14 poles in 108 slots

Overall modulation, for pole-changing of a P.A.M. winding may be either sum modulation or difference modulation. For the pole-combination of this example, sum modulation means an overall modulation wave of $(8+14)=22$ poles, and modulation from 8 poles to 14 poles; difference modulation means an overall modulation wave of $(14-8)=6$ poles, and modulation from 14 poles to 8 poles.

Choice depends mainly upon the harmonic spectrums which result from the two modules of modulation. The present example is one using difference modulation.

There is first prepared the 14-pole clock diagram with 42 coil-groups. There will be 6 modulating poles, as stated, each with 7 coil-groups and 18 coils, making the total of 108 slots.

According to the earlier, near-sinusoidal, modulation theory, the coil-group distribution of the 18 coils would be 1-2-3-5-4-2-1 the coil-group of 5 coils representing the centre of the modulating pole.

Below, this coil-group distribution is reproduced below at (A). Derived coil-group distributions with progressively increasing third-harmonic content are shown at (B)-(E). The intermediate lines (a)-(d) indicate those coil-groups from which coils have been taken (−) and those other coil-groups to which coils have been added (+). The numbers, with signs, represent the resultant change from the original sinusoidal coil-grouping. A zero represents a return to the original coil-group number.

|     |     |                              |
| --- | --- | ---------------------------- |
| (A) |     | 1 - 2 - 3 - 5 - 4 - 2 - 1    |
|     | (a) | +1 −1                        |
| (B) |     | 1 - 2 - 4 - 4 - 4 - 2 - 1    |
|     | (b) | +1 0 −1 −1 +1                |
| (C) |     | 1 - 3 - 3 - 4 - 3 - 3 - 1    |
|     | (c) | +1 0 −2 −1 +1 +1             |
| (D) |     | 1 - 3 - 3 - 3 - 3 - 3 - 2    |
|     | (d) | +1 +1 −3 0 +1 0              |
| (E) |     | 1 - 3 - 4 - 2 - 4 - 3 - 1    |

Of the five options listed above, (A), (B) and (C) have insufficient third-harmonic modulation content. Option (E) has excessive third-harmonic modulation content. Option (D) is chosen.

It is of non consequence to the method of the invention whether a machine according to each of the five options is actually made up and tested. It would be wasteful of time and material to do so, however, and computer analysis is preferred. The end result is the same.

FIG. 13 shows the coil-grouping per phase band and overall modulation wave for the 14-pole/8-pole P.A.M. winding in 108 slots, using the coil-group distribution option (D) above, in accordance with the invention.

However, the winding according to the invention is an intermediate winding in the practical design of the preferred winding for this pole-combination and slot-number.

This intermediate winding is one upon which a further, and already known, design expedient, called interspersing, may be performed.

According to this method, adjacent coils or coil-groups are exchanged, one for the other. Provided that the process is exactly repeated, at equally-spaced points around the winding circumference, thereby affecting each pair of the three phases equally, the resultant e.m.f. balance of the winding is unaffected.

In a P.A.M. winding, which uses series/parallel connections for pole-changing, six equally spaced apart coil pairs or coil-group pairs must be interchanged.

FIG. 13 indicates the six coil-group pairs concerned, by means of interchange arrows, and shows the resultant winding after such interchange, with the resultant coil-grouping: 2-3-3-3-3-3-1 per modulating pole.

It this coil-grouping is compared with the coil-grouping (A), given above, it will be evident that a third harmonic of modulation has been superimposed upon the wave form of (A).

FIG. 14 is the winding diagram of the derived winding for 14 poles/8 poles in 108 slots. The coil-pitch is 11 slots. The 10-pole adjacent harmonic in the 14-pole connection is 10.0%. The winding factors are $W_{14}=0.696$ and $W_8=0.793$. The air-gap flux-density ratio $(B_8/B_{14})=0.99$.

The total number of coil-groups used is 42.

I claim:

1. A three-phase alternating current electric machine for alternative pole-number operation, having a symmetrical pole-amplitude modulation three-phase stator winding switched to provide the alternative pole-numbers, said pole-number switching being effected by including all coils of each phase-winding in a selected one of two phase-winding parts, said phase-winding parts being connected together alternatively in series and in parallel in order to provide said alternative pole-numbers, and the coils of the phase-windings being grouped to produce a modulation pattern waveform of approximately sinusoidal form with added third-harmonic modulation content, whereby the adjacent harmonic content of the m.m.f. waveform of the three-phase winding is less for both pole-numbers than for a modulation waveform of sinusoidal form without added third-harmonic modulation content.

2. A symmetrical P.A.M. winding as claimed in claim 1, in which pole-amplitude modulation is sum overall modulation.

3. A symmetrical P.A.M. winding as claimed in claim 1, in which pole-amplitude modulation is difference overall modulation.

4. A method of designing the stator winding for a three-phase alternating current machine, said stator winding being adapted for switching to provide alternative pole-numbers by pole-amplitude modulation and by having similar half phase-windings for connection alternatively in series and in parallel, said method comprising the steps of:

selecting a desired pole-combination and stator slot-number;

dividing the said slot-number into two factors, the first factor being one of the numbers "6", "12", "18", and "24" and the second factor defining the number "S" of slots of each half of an initial winding element;

selecting from the alternative phase coil-distributions possible for an initial winding element in S-slots a distribution which, for the winding element itself, provides a low adjacent harmonic content and near balance between phases; and deriving the final winding from the initial winding element by at least one stage of symmetrization.

5. A method as claimed in claim 4, in which, in the fourth step thereof, that winding element is selected which has the phase coil-distribution: $A=(S-2)$, $B=1$ and $C=1$.

6. A method as claimed in claim 4, in which the final step of symmetrization is effected according to the following rule:

if the first slot-number factor is "6", a single stage of symmetrization;

if the first slot-number factor is "12", a single stage of symmetrization and a single stage of part-symmetrization;

if the first slot-number factor is "18", two stages of symmetrization; and if the first slot-number factor is "24", a single stage of symmetrization and two stages of part-symmetrization.

7. A method as claimed in claim 4, in which the alternative pole-numbers are an asymmetrical pole-combination.

8. A method as claimed in claim 4 in which the alternative pole-numbers differ by one pole-pair.

* * * * *